(12) United States Patent
Brandstein et al.

(10) Patent No.: US 9,556,348 B2
(45) Date of Patent: *Jan. 31, 2017

(54) PHOTO-CURABLE INK COMPOSITION

(71) Applicant: Hewlett-Packard Industrial Printing LTD, Netanya (IL)

(72) Inventors: Or Brandstein, San Diego, CA (US); Nataly Lisitsin, Holon (IL); Alex Trubnikov, Petach Tiqwa (IL); Eytan Cohen, Raanana (IL)

(73) Assignee: Hewlett-Packard Industrial Printing LTD., Netanya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/424,598

(22) PCT Filed: Aug. 29, 2013

(86) PCT No.: PCT/IB2013/058113
§ 371 (c)(1),
(2) Date: Feb. 27, 2015

(87) PCT Pub. No.: WO2014/033656
PCT Pub. Date: Mar. 6, 2014

(65) Prior Publication Data
US 2015/0247044 A1  Sep. 3, 2015

(30) Foreign Application Priority Data

Aug. 31, 2012  (EP) ..................................... 12182590

(51) Int. Cl.
  *C09D 11/30* (2014.01)
  *C09D 11/107* (2014.01)
  *C09D 11/102* (2014.01)
  *C09D 11/322* (2014.01)
  *C09D 11/101* (2014.01)

(52) U.S. Cl.
  CPC ............. *C09D 11/30* (2013.01); *C09D 11/101* (2013.01); *C09D 11/102* (2013.01); *C09D 11/107* (2013.01); *C09D 11/322* (2013.01)

(58) Field of Classification Search
  None
  See application file for complete search history.

(56) References Cited

U.S. PATENT DOCUMENTS 6,294,592 B1 * 9/2001 Herrmann ............ B41M 5/0023
                                                                 106/31.6
6,534,128 B1   3/2003 Carlson et al.
(Continued)

FOREIGN PATENT DOCUMENTS

CN    1721463    1/2006
CN  101191027    6/2008
(Continued)

*Primary Examiner* — An Do
*Assistant Examiner* — Renee I Wilson
(74) *Attorney, Agent, or Firm* — HP Inc. Patent Department

(57) ABSTRACT

A photo-curable ink composition including colorant, water, photo-initiator, UV curable polyurethane dispersions, hydrophobic radiation-curable monomers and water-soluble or water-miscible radiation curable monomers. Also disclosed herein is a method for forming a printed article and an inkjet printing system using said photo-curable ink composition.

15 Claims, 1 Drawing Sheet

(56) References Cited

U.S. PATENT DOCUMENTS

| | | |
|---|---|---|
| 7,977,398 B2 | 7/2011 | Cornell et al. |
| 8,124,671 B2 | 2/2012 | Takabayashi |
| 2002/0198289 A1 | 12/2002 | Gummeson |
| 2003/0119941 A1* | 6/2003 | Batting ............... C09D 11/101 523/160 |
| 2003/0134931 A1 | 7/2003 | Chatterjee et al. |
| 2004/0091645 A1 | 5/2004 | Heederik et al. |
| 2007/0106017 A1 | 5/2007 | Kessel et al. |
| 2008/0316244 A1 | 12/2008 | Lugassi et al. |
| 2011/0287236 A1* | 11/2011 | Nakano ............... C09D 11/101 428/195.1 |

FOREIGN PATENT DOCUMENTS

| | | | |
|---|---|---|---|
| CN | 101283060 | 10/2008 | |
| EP | 1036831 | 9/2000 | |
| EP | 1469049 | 10/2004 | |
| EP | 1616921 | 1/2006 | |
| EP | 2233540 | 9/2010 | |
| GB | 2217723 A * | 11/1989 | ........... C09D 11/101 |
| JP | 2003518545 | 6/2003 | |
| JP | 2005280346 | 10/2005 | |
| JP | 2008100493 | 5/2008 | |
| JP | 2008531779 | 8/2008 | |
| JP | 2009132151 | 6/2009 | |
| KR | 20030045174 | 6/2003 | |
| WO | WO 01057145 | 8/2001 | |
| WO | WO-2007036692 | 4/2007 | |
| WO | WO-2011021052 | 2/2011 | |
| WO | WO2012/110802 | 8/2012 | |
| WO | WO2012110802 * | 8/2012 | .............. B41M 7/00 |

* cited by examiner

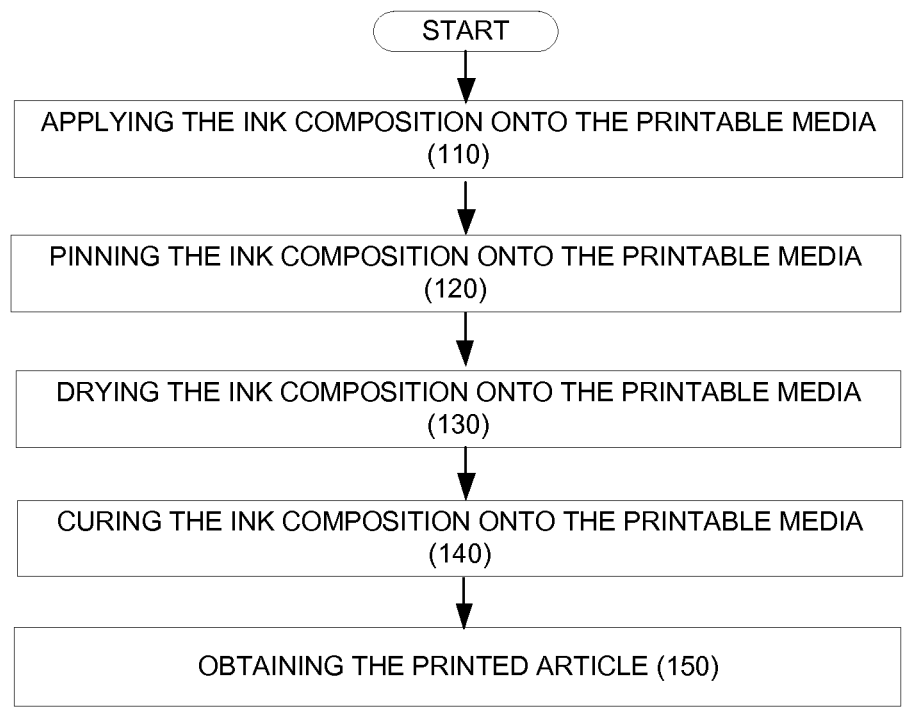

PHOTO-CURABLE INK COMPOSITION

BACKGROUND

Inkjet technology has expanded its application to high-speed, commercial and industrial printing, in addition to home and office usage, because of its ability to produce economical, high quality, multi-colored prints. This technology is a non-impact printing method in which an electronic signal controls and directs droplets or a stream of ink that can be deposited on a wide variety of substrates. Inks used in such technologies can be liquid dispersions, solution, or emulsions and can include oil-based inks, non-aqueous solvent based inks, water-based inks and solid inks. Current inkjet printing technology involves forcing the ink drops through small nozzles by thermal ejection, piezoelectric pressure or oscillation, onto the surface of a media. The deposited ink droplets are, then, dried, e.g., using heat or forced air, or allowed to dry at ambient conditions.

Recently, curing of ink by radiation, and in particular ultraviolet (UV) curing, has become popular. In these cases, special ink is used and the image is cured by exposure to a radiation source. The uses of such radiation-curable (or photo-curable) inks and the curing process are rapidly becoming an alternative to the established conventional drying process.

The inkjet printing industry uses different types of recording fluids such as oil-based inks, solvent-based (non-aqueous) inks, water-based inks, and solid inks (which are melted in preparation for dispensing). Solvent-based inks are fast drying, and as a result, are widely used for industrial printing. When solvent-based inks containing binders and other ingredients are jetted onto a substrate, the solvent(s) partially or fully evaporate from the ink, leaving the binder and other ingredients such as pigment particles on the printed substrate in the form of a dry film. During the drying process, the solvents, which are often volatile organic compounds (VOC), emit vapors, and therefore, can pollute the environment. The pollution problem becomes more critical for higher printing speeds or for wide format images, where large amounts of ink are deposited onto a substrate.

As a result of this and other concerns, efforts related to preparing inks that are environmentally friendly have moved some research in the direction of water-based inks. However, radiation-curable (or photo-curable) water-based ink compositions are noticeably limited among available options due to their specific features. Accordingly, investigations continue into developing radiation-curable water-based ink compositions that exhibit, when printed, specific and excellent printing properties such as, for example, jetting properties as well as improved adhesion.

BRIEF DESCRIPTION OF THE DRAWING

The drawing illustrates embodiments of the present method and is part of the specification.

FIG. 1 is a flowchart illustrating a method for producing printed articles according to some embodiments of the present disclosure.

DETAILED DESCRIPTION

Before particular embodiments of the present disclosure are disclosed and described, it is to be understood that the present disclosure is not limited to the particular process and materials disclosed herein. It is also to be understood that the terminology used herein is used for describing particular embodiments only and is not intended to be limiting, as the scope of protection will be defined by the claims and equivalents thereof. In describing and claiming the composition and method, the following terminology will be used: the singular forms "a", "an", and "the" include plural referents unless the context clearly dictates otherwise. Thus, for example, reference to "a pigment" includes reference to one or more of such materials. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For examples, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc. All percent are by weight (wt %) unless otherwise indicated.

The present disclosure refers to a photo-curable ink composition containing colorant, water, photo-initiator, UV curable polyurethane dispersions, hydrophobic radiation-curable monomers and water-soluble or water-miscible radiation curable monomers.

Also disclosed is a method for forming a printed article with said photo-curable ink composition and an inkjet printing system including said photo-curable ink composition. The present disclosure refers also to a method for preparing a photo-curable ink composition containing colorant, water, photo-initiator, UV curable polyurethane dispersions, hydrophobic radiation-curable monomers and water-soluble or water-miscible radiation curable monomers.

The photo-curable ink composition as described herein can be printed in a broad selection of substrates including untreated plastics, flexible as well as rigid, porous substrates such as paper, cardboard, foam board and textile and has a good adhesion on said variety of substrates. The photo-curable ink composition has a good viscosity that enables good printing performances and enables the ability to formulate inks suitable for inkjet application. The photo-curable ink composition of the present disclosure enables thus high printing speed and is very well suited for a use in digital inkjet printing.

When printed on a substrate and cured, said ink composition has improved adhesion to non-polar surfaces. The composition possesses also good scratch resistance and weatherability. It can support high curing speed and has a viscosity enabling good jetting properties. Therefore, the water-based photo-curable ink composition allows reliable jetting, fast drying and curing, ability to print on various media substrates while having excellent image quality and adhesion.

The ink composition is photo-curable (or UV-curable or radiation-curable) ink composition. Said composition is a jettable ink composition meaning thus that the ink can be used with inkjet printing device. The term "curing", in the context of the present disclosure, refers to a process of converting a liquid, such as ink, into a solid by exposure to actinic radiation such as photo-radiation, e.g., ultraviolet (UV) radiation. In the uncured state, ink compositions have a low viscosity and are readily jetted. However, upon exposure to suitable source of curing energy, for example ultraviolet (UV) light, electrons beam energy, and/or the like, there is a formation of a cross-linked polymer network. Such ink compositions are commonly referred to as "energy-curable" inks to distinguish them from "solvent-based" inks.

The ink composition is a water-based photo-curable ink composition, meaning thus that it contains a certain amount of water as solvent. The amount of water in the ink composition is dependent, for example, on the amount of other components of the ink composition. The amount of water in the ink composition includes the amount of water added plus the amount of water in the suspensions and other components of the ink composition. In some examples, the amount of water in the ink composition is in the range of about 10 to about 90 wt % by total weight of the ink composition, in some other example; in the range of about 20 to about 80 wt % by total weight of the ink composition and, in yet some other example, in the range of about 30 to about 70 wt %.

In some examples, the ink composition has a viscosity, at 25° C., of not greater than about 70 cps (centipoises); of not greater than about 50 cps, or, of not greater than about 30 cps. In some other examples, the viscosity of the ink composition is ranging from about 2 cps to about 20 cps at a jetting temperature of about 20° C. to about 55° C. The ink composition can have a static surface tension, at 25° C., of not greater than about 40 dynes/cm or ranging from about 20 cps to about 40 dynes/cm.

UV Curable Polyurethane Dispersion

The ink composition according to the present disclosure includes UV curable polyurethane dispersion, i.e. UV-PUD. As polyurethane dispersion, it is meant herein polyurethane particles that are dispersed in the liquid vehicle. Without being linked by any theory, it is believed that such UV curable polyurethane dispersions provide improved ink film properties to the media on which the ink is applied. Such films, formed by the drying and cross-linking of UV-PUD, are glossy and hard yet flexible.

In some examples, polyurethane dispersions (PUD) are stable dispersions, in water, of polyurethane polymer particles whose size ranges from about 20 to about 200 nm. The polyurethane dispersions can have a Mw in the range of about 1,000 to 100,000 or in the range of about 5,000 to about 50,000. Polyurethane polymer particles can be present in an amount representing from about 1 wt % to about 25 wt %, or from about 5 wt % to about 20 wt % by total weight of the ink composition in some examples.

Polyurethane polymer particles can have a core-shell structure with a branched inner core structure, wherein the core includes an amine cross-linker in an amount of about 0.1 wt % to about 1 wt % and wherein the shell includes a polyol cross-linker in an amount of about 0.5 wt % to about 2 wt %.

The branched inner core structure can be provided by a branched diisocyanate which can be a cyclic diisocyanate. The branched inner core structure can also be provided by a branched diol or a cyclic diol. Polyurethane particles may further contain polymerized monomers including a polyol, a branched diisocyanate, and an acid polyol. Polyurethane polymer particles can include a hard segment (including a diisocyanate) and a soft segment and can also include a chain extender. A chain extender can be any compound capable of polymerizing with the diisocyanate such that the chain extender resides in the hard segment of the polyurethane.

Polyurethane polymer particles include various polyols that can be present as a diol polymerized within a hard segment of the polyurethane particle. In some examples, the polyol can be a diol selected from the group of: cyclic diols; 1,3-cyclohexanedimethanol; 1,4-cyclohexanedimethanol; aliphatic polycarbonate diols; polyether diols; polyethylene glycol; polypropylene glycol; polytetramethylene glycol; poly(ethylene oxide) polymers; poly(propylene oxide) polymers; poly(tetramethylene oxide) polymers; copolymers thereof having terminal hydroxyl groups derived from polyhydric compounds including diols; and combinations thereof. In one aspect, the diol can be cyclic diol. In another aspect, the diol can be an aliphatic cyclic diol. In still another aspect, the diol can be 1,4-cyclohexanedimethanol. The diisocyanates can be selected from the group of cycloaliphatic diisocyanates, bis(4-isocyanotocyclohexyl) methane, methylene diphenyl diisocyanate, hexamethylene diisocyanate, p-tetramethyl xylene diisocyanate, m-tetramethyl xylene diisocyanate, bitolylene diisocyanate, toluene diisocyanate, methylene-bis(4-cyclohexyl)diisocyanate, p-phenylene diisocyanate, isophorone diisocyanate, 1,5-naphthalene diisocyanate, and mixtures thereof. In one aspect, the diisocyanate can be a cycloaliphatic diisocyanate. The acid polyol can have the structure HO—$(CH_2)n(CR_1R_2)m(CH_2)$p-OH where $R_1$ and $R_2$ are independently H, hydroxyl, an alkyl group, or an acid group; n ranges from 0 to 20; p ranges from 0 to 20; and m ranges from 1 to 20; wherein at least one of $R_1$ and $R_2$ is an acid group.

The polyurethane polymer particles can have various concentrations of the polyols (both in the hard and soft segments), acid polyols, and diisocyanates. Diisocyanate can be present in the polyurethane particles from about 10 wt % to about 70 wt %. The acid polyol can be present in the polyurethane particles from about 1 wt % to about 40 wt %. In further detail, diols can be present from about 1 wt % to about 3 wt %.

In some examples, UV-PUD are water-dispersible acrylic functional polyurethane dispersions. In some other examples, UV-PUD are water-dispersible (meth)acrylated polyurethane dispersions. By water-dispersible (meth)acrylated polyurethane is meant herein a polymer that, when mixed with water, can form a two-phase system of small particles dispersed in water.

Such polyurethane dispersions can be obtained from the reaction of at least one poly-isocyanate compound; optionally, at least one polyol; at least one hydrophilic compound containing, at least, one reactive group capable to react with isocyanate groups and which is capable to render the polyurethane dispersible in aqueous medium either directly or after reaction with a neutralizing agent to provide a salt, and at least one (meth)acrylated compound containing, at least, one reactive group capable to react with isocyanate groups.

Water-dispersible (meth)acrylated polyurethane can be, water-dispersible resins, such as, for examples, compounds commercialized under the name of Ucecoat®6558, Ucecoat®6559, Ebecryl®2002 and Ebecryl®2003 available from Cytec. Such water-dispersible resins can form solution in water when mixed in the appropriate solubility ratio with water, such as, for example solution containing up to 10 wt % of water and 90 wt % of polymer.

In some embodiments, the UV curable polyurethane dispersions (UV-PUD) is an water-dispersible (meth)acrylated polyurethane, sold under the trade name of NeoRad® R441 by NeoResins (Avecia). Other representative but non limiting examples of UV-PUD include Ucecoat®7710, Ucecoat®7655 (available from Cytec), Neorad®R440, Neorad®R441, Neorad®R447, Neorad®R448 (available from DSM NeoResins), Bayhydrol®UV 2317, Bayhydrol®UV VP LS 2348 (available from Bayer), Lux®430, Lux®399, Lux®484 (available from Alberdingk Boley), Laromer®LR8949, Laromer®LR8983, Laromer® PE22WN, Laromer®PE55WN, Laromer®UA9060 (available from BASF).

Hydrophobic Radiation-Curable Monomers

The photo-curable ink composition described herein may include one or more hydrophobic radiation-curable monomers. Subject to desired performance standards, any hydrophobic radiation-curable monomers with sufficient hydrolytic stability or combinations thereof may be incorporated into the ink composition described herein. Accordingly, the ink composition is not limited to specific kinds of hydrophobic radiation-curable monomers in various aspects so long as any such performance conditions are satisfied.

The hydrophobic radiation-curable monomers may be mono-, di-, tri-, tetra- or otherwise multifunctional in terms of radiation-curable moieties. In some examples, the UV curable polyurethane dispersion and the hydrophobic monomers form a non-aqueous phase, in the ink composition, that could represent from about 20 wt % to about 50 wt % by total weigh of the ink composition.

The hydrophobic radiation-curable monomers can function as solvents for the photo-initiators, as viscosity modifiers, as binders when cured, and/or as cross-linking agents. The amount of such hydrophobic radiation-curable monomers to be incorporated into the ink can vary within a wide range depending upon the intended use of the resultant composition. The hydrophobic monomer can be present at a level of about 1 to about 15% by weight based on the total weight of the ink composition. In some examples, the hydrophobic monomer is present in an amount representing from about 3 to about 8 wt % based on the total weight of the ink composition. The hydrophobic monomer can be emulsified in the ink composition.

In some examples, the hydrophobic radiation-curable monomers are hydrophobic monofunctional radiation-curable monomers. In some other examples, the hydrophobic radiation-curable monomers are acrylate monomers or vinyl monomers.

The monofunctional hydrophobic radiation-curable monomers can be acrylate monomer. The acrylate monomer can be selected from the group consisting of 2-phenoxyethyl acrylate, isophoryl acrylate, isodecyl acrylate, tridecyl acrylate, lauryl acrylate, 2-(2-ethoxy-ethoxy)ethyl acrylate, tetrahydrofurfuryl acrylate, isobornyl acrylate, propoxylated acrylate, tetrahydrofurfuryl methacrylate, 2-phenoxyethyl methacrylate, isobornyl methacrylate and combinations of two or more thereof.

Monofunctional hydrophobic radiation-curable monomers can be vinyl monomers. Vinyl monomer can be selected from the group consisting of vinyl caprolactam, vinyl ether and any combinations thereof. In some examples, hydrophobic radiation-curable monomers used herein are the ones that do not require labeling with Xi or any other danger symbol, like, for example, 2-phenoxy-ethylacrylate, available from Sartomer under the tradename SR339C.

In some embodiments, hydrophobic radiation-curable monomers are selected from the group consisting of vinyl caprolactams, hexanediol diacrylates, trimethylolpropane triacrylates and propoxylated neopentyl glycol diacrylates. In some other some embodiments, hydrophobic radiation-curable monomers are vinyl caprolactams.

The hydrophobic radiation-curable monomers can be hydrophobic multifunctional radiation-curable monomers. Examples of such higher functional, radiation-curable monomers include hexanediol diacrylate, ethoxylated bisphenol A diacrylate, trimethylolpropane triacrylate, tris(2-hydroxyethyl) isocyanurate triacrylate, combinations of these, and the like. In some examples, multifunctional radiation-curable used herein are the ones that do not require labeling with Xi or any other danger symbol, like propoxylated neopentyl glycol diacrylate, available from Sartomer under the tradename SR 9003.

Water-Soluble or Water-Miscible Radiation Curable Monomers

The ink composition, according to the present disclosure, encompasses of one or more water-soluble or water-miscible radiation curable monomers. As water-soluble or water-miscible radiation curable monomers, it is meant herein any radiation curable monomers that have sufficient water solubility and hydrolytic stability. Such monomer should be capable of being polymerized by radiation and should be soluble or miscible in water.

The water-soluble or water-miscible radiation curable monomers may be mono-, di-, tri-, tetra- or otherwise multifunctional in terms of radiation curable moieties. In some examples, it can be said that the water-soluble or water-miscible monomers function as a cross linking agent in order to achieve the desired polymer network formation during the pinning stage of the printing method described below. Water-soluble or water-miscible radiation curable monomers can be present in an amount ranging from about 1 to about 15 wt %, or from about 2 to 10 wt %, or from 3 to 8 wt %, by total weight of the ink composition.

Examples of suitable water-soluble monomers include esters of acrylic or methacrylic acid with polyethylene glycol or with a mono-, di-, tri- or tetra-hydric alcohol derived by ethoxylating a mono-, di, tri- or tetra-hydric aliphatic alcohol of molecular weight less than 200 with ethylene oxide.

Examples of ethylenically unsaturated compounds are acrylate esters of polyethylene glycols made from a polyethylene glycol having a molecular weight of from about 200 to about 1500, or from about 400 to about 800; and acrylic esters of ethoxylated trimethylolpropane, having from 9 to 30 ethoxylate residues, or from 10 to 20 ethoxylate residues. Other examples of ethylenically unsaturated compounds are acrylate esters of polyethylene glycols made from a polyethylene glycol having a molecular weight of from about 200 to about 1500 and acrylic esters of ethoxylated trimethylolpropane having from 9 to 30 ethoxylate residues.

Representative and non-limiting examples of water-soluble or water-miscible monomers include polyethylene glycol (600) diacrylate, polyethylene glycol (400) diacrylate, methoxy polyethylene glycol (550) mono-acrylate, polyethylene glycol (6) mono-acrylate, 30 ethoxylated bisphenol-A diacrylate, ethoxylated (20) trimethylopropane-triacrylate, (15) ethoxylated trimethylolpropane-triacrylate, tris-trylphenol 18eo acrylate, glycerol 12eo triacrylate. In some other examples, water-soluble radiation curable monomers are ethoxylated trimethylolpropane triacrylates.

Suitable commercially available materials include the following UV-curable materials available from Sartomer such SR415® (ethoxylated (20) trimethylolpropane-triacrylate), CN435® or SR9015®. Other examples of commercially available water-soluble or dispersible monomers include: CD550® (methoxy polyethylene glycol (350) mono-methacrylate), CD552® (methoxy polyethylene glycol (550) mono-methacrylate), SR259® (polyethylene glycol (200) diacrylate), SR344® (polyethylene glycol (400) diacrylate), SR603® (polyethylene glycol (400) di-methacrylate), SR610® (polyethylene glycol (600) diacrylate), SR252® (polyethylene glycol (600) di-methacrylate), SR604® (polypropylene glycol mono-methacrylate, SR256® (2-(2-ethoxyethoxy)ethyl acrylate), SR9035 (ethoxylated(15)trimethylolpropane triacrylate), all available from Sartomer; Ebecryl®11 (polyethylene glycol diacrylate), and Ebecryl®12 (polyether triacrylate) available from UCB; Genomer®1251 (polyethylene glycol 400 diacrylate), Genomer®1343 (ethoxylated trimethylolpropane triacrylate), Genomer® 1348 (glycerol-propoxy triacrylate), Genomer®1456 (polyether polyol tetra-acrylate), and diluent 02-645 (ethoxy ethyl acrylate), all available from Rahn.

In some embodiments, water-soluble radiation curable monomers are acrylamides monomers. Representative and non-limiting examples of acrylamides water-soluble or water-miscible monomers include N-(2-hydroxyethyl) acrylamide; N,N'-methylene bis-acrylamides and/or N-isopropyl acrylamides. Commercially available water-soluble or dispersible monomers include, for examples, Flocryl®MBA available from SNF FLOERGER (France); Jarchem®HEAA or Jarchem®NIPAM both available from Jarchem (USA, N.J.).

Photo-Initiator

The photo-curable ink composition described herein include a photo-initiator. The photo-initiator, or UV initiator, is an agent that initiates a reaction upon exposure to a desired wavelength of UV light to cure the ink composition, as described herein, after its application to an ink-receiving material or substrate. In some examples, the photo-initiator is a radical photo-initiator. The photo-initiator may be a single compound or a mixture of two or more compounds. It can be present in the ink composition in an amount sufficient to cure the applied ink composition. In some examples, the photo-initiator is present in an amount representing from about 0.01 to about 10 wt %, or from about 1 to about 5 wt % by weight, based on the total weight of the ink composition.

The photo-initiator can be a water-soluble or a water-dispersible photo-initiator and can be incorporated into the aqueous phase of the ink composition. In some examples, the photo-initiator is a hydrophobic photo-initiator and is incorporated into the hydrophobic radiation-curable monomers. The hydrophobic monomer may be incorporated into the UV-PUD during synthesis and/or to the ink by emulsification. In some other examples, the photo-initiator is dissolved within the hydrophobic radiation-curable monomers. The photo-initiator may be a combination of few photo-initiators, which absorb at different wavelengths.

Examples of radical photo-initiator include, by way of illustration and not limitation, 1-hydroxy-cyclohexylphenylketone, benzophenone, 2,4,6-trimethylbenzo-phenone, 4-methylbenzophenone, diphenyl-(2,4,6-trimethylbenzoyl) phosphine oxide, phenyl bis(2,4,6-trimethylbenzoyl)phosphine oxide, 2-hydroxy-2-methyl-1-phenyl-1-propanone, benzyl-dimethyl ketal, 2-methyl-1-[4-(methylthio)phenyl]-2-morpholinopropan-1-one, or combinations of two or more of the above. Amine synergists may also be used, such as, for example, ethyl-4-dimethylaminobenzoate, 2-ethylhexyl-4-dimethylamino benzoate.

The photo-curable ink composition may include a UV stabilizer, i.e. an agent that can assist with scavenging free radicals. Examples of UV stabilizers include, by way of illustration and not limitation, quinine methide (Irgastab®UV 22 from BASF Corporation) and Genorad®16 (Rahn USA Corporation) and combinations thereof.

In some examples, a photosensitizer may be used with the photo-initiator in amounts ranging from about 0.01 to about 10 wt %, or from about 1 to about 5 wt %, based on the total weight of the ink composition. A photosensitizer absorbs energy and then transfers it to another molecule, usually the photo-initiator. Photosensitizers are often added to shift the light absorption characteristics of a system. Suitable examples of photosensitizers include, but are not limited to, thioxanthone, 2-isopropylthioxanthone and 4-isopropylthioxanthone.

Colorant

The photo-curable ink composition described herein may include pigments or dyes as colorants. In some embodiments, the ink compositions include one or more pigments as colorants. Insoluble pigment colorants can assist in achieving a better image performance. The pigments can be self-dispersed pigments, polymer-coated pigments, or common pigments such as milled pigments, for example. A separate dispersing agent may be used to enable appropriate suspension of the pigment in the ink composition. The particulate pigment may be inorganic or organic. The pigment can be of any color including, but not limited to, black, blue, brown, cyan, green, white, violet, magenta, red, orange and yellow, as well as spot colors from mixtures thereof.

Examples of organic pigments that may be present in the photo-curable ink composition include, by way of illustration and not limitation, perylene, phthalocyanine pigments (for example, phthalo green, phthalo blue), cyanine pigments (Cy3, Cy5, and Cy7), naphthalocyanine pigments, nitroso pigments, mono-azo pigments, di-azo pigments, di-azo condensation pigments, basic dye pigments, alkali blue pigments, blue lake pigments, phloxin pigments, quinacridone pigments, iso-indolinone pigments, di-oxazine pigments, carbazole di-oxazine violet pigments, alizarine lake pigments, phthaloxy amine pigments, carmine lake pigments, tetrachloroisoindolinone pigments, perinone pigments, thio-indigo pigments, anthraquinone pigments and quinophthalone pigments, and mixtures of two or more of the above and derivatives of the above. Inorganic pigments that may be present in the ink composition, include, for example, metal oxides (for example, titanium dioxide, electrically conductive titanium dioxide, iron oxides (e.g., red iron oxide, yellow iron oxide, black iron oxide and transparent iron oxides), aluminum oxides, silicon oxides), carbon black pigments (e.g., furnace blacks), metal sulfides, metal chlorides, and mixtures of two or more thereof.

Examples of pigment colorants that may be employed include, by way of illustration and not limitation, yellow pigments having the following Yellow Pigment color index PY 83, PY 151, PY 150, PY 155, PY 139, PY120, PY180, PY 129 and PY 154, PY213. Magenta pigments composed of Red pigment having color indices of PR 202, PR 254, PR 122, PR149, PR185, PR255, PR146 and Violet pigment having color indices of PV 19, PV 23, PV37 and PV 29 may be used. Blue pigments having color indices of PB 15:3, PB 15:4, PB15:2 and PB15:1, as well as black pigments having color indices of PBL Black 7 also may be utilized. Inorganic pigment such as a white pigment of the type $TiO_2$ also may be used. Orange pigment having color indices of PO46, PO64, PO34 as well as green pigments having color index of PG7 also may be employed.

The pigment component can be a dispersible pigment, such as, for example, pigment available under the trade names Paliotol®, Heliogen®, Chromophtal®, Irgalite®, Cinquasia® (available from BASF), Hostaperm®, Novoperm® (available from Clariant), Sunfast®, Quindo® (available from SunChemical), Special Black (available from Degussa), Kronos® (available from Kronos), Kemira® (available from Kemira Pigments).

The amount of pigment in the photo-curable ink composition depends on a number of factors, for example, the nature of the pigment, the nature of the use of the ink composition, the nature of the jetting mechanism for the ink, and the nature of any additives, for example. The ink composition may contain up to 20 wt % of pigment. In some example, the amount of pigment, in the photo-curable ink composition, is from about 0.1 to about 20 wt %, or from about 1 to about 15 wt %, or from about 5 to about 10 wt %.

Solvent

The photo-curable ink composition described herein may contain an organic solvent. The organic solvent can be soluble (water-soluble) or miscible in water (water-miscible). Such water-soluble soluble or water-miscible solvent can be added to the ink composition while milling pigment concentrate in order to optimize pigment dispersion, color development, and stability. The amount of the organic solvent in the ink composition is dependent on a number of factors such as, for example, optimization of a film forming process, jetting reliability, and maintaining a low VOC content of the ink composition.

When present, the amount of organic solvent in the ink composition is about 0.1 wt % to about 5 wt % by total weight of the ink composition. The nature of the organic solvent is dependent, for example, on the evaporation qualities or volatility of the organic solvent. A single organic solvent may be employed or a combination of two or more organic solvents may be used. In some examples, the organic solvent is a polar organic solvent having carbon atoms and heteroatoms. For example, the organic solvent may have from about 2 to about 50 carbon atoms, or from about 10 to about 30 carbon atoms. The heteroatoms may be in the form of one or more alcohol moieties, ether moieties, ketone moieties, aldehyde moieties, amine moieties, and amide moieties, for example. The organic solvent may have a boiling point of about 170° C. to about 250° C., or about 190° C. to about 220° C., for example.

The organic solvent can be, by way of illustration and not limitation, an alcohol; a polyhydric alcohol; a glycol derivative such as, e.g., an ether or an ester; an amine; an amide; and other organic solvents such as, for example, dimethylsulfoxide, sulfolane, 2-pyrrolidone, 2-oxazolidone, 1,3-dimethyl-2-imidizolidinone. The above-mentioned organic solvents can be used in combination of two or more thereof. In some examples, the organic solvent is a glycol, a glycol ether, an alcohol, or a heterocyclic ketone, or a combination of two or more of the above. Some examples of particular organic solvents include, by way of illustration and not limitation, glycol ether solvents, for example, tri-propylene glycol monomethyl ether (Dowanol®TPM), dipropylene glycol ether (Dowanol®DPG), dipropylene glycol dimethyl ether (Proglyde®DMM) (all available from Dow Chemical Company, Midland Mich.), for example.

Other Components and Additives

Other components and additives may be present in the photo-curable ink composition in order to improve ink properties and performances. The additives include, but are not limited to, one or more of surfactants, dispersing agents, rheology modifiers, biocides, anti-foaming agents, and UV stabilizers. In some examples, the photo-curable ink composition of the present disclosure further contains one or more additives selected from the group consisting of surfactant, dispersing agent, UV stabilizer, de-foaming agent, rheology modifiers and biocides. The total amount by weight of additives in the ink composition is, for example, from about 0.1 to about 1 wt % or, from about 0.2 to about 0.5 wt %.

Surfactants include, for example, those commercially available under the brand names: WET® and GLIDE® (from Evonik Tego Chemie GmbH, Essen, Germany); BYK® (from BYK Chemie GmbH, Wesel, Germany); Dynax® (from Dynax Corp. Pound Ridge N.Y.); 3M Novec® (from 3M Energy and Advanced Materials, St. Paul Minn.); and Zonyl® FSO (from DuPont de Nemours Company, Wilmington Del.).

Examples of anti-foaming agents are those commercially available under the brand names: Foamex® and Twin® (from Evonik Tego Chemie Service GmbH); BYK® (from BYK Chemie GmbH); and Surfynol® (from Air Products and Chemicals, Inc.).

Examples of dispersants include high molecular weight copolymers with groups having an affinity for a pigment. Specific examples of dispersants include those commercially available from BYK Chemie GmbH under the brand names BYK®.

Examples of rheology modifiers include those commercially available under the brand names: Acrysol® (from Rohm & Haas); Borchigel® (from OMG Borchers GmbH, Langenfield, Germany); BYK® (from BYK Chemie GmbH); and DSX® (from Cognis GmbH, Monheim am Rhein, Germany).

Method for Forming a Printed Article and Printing System

In some embodiments, the method for forming a printed article includes: providing a photo-curable ink composition containing colorant, UV curable polyurethane dispersions, water, photo-initiator, hydrophobic radiation-curable monomers and water-soluble or water-miscible radiation curable monomers; providing a media substrate; projecting (or jetting) of stream of droplets of said photo-curable ink composition onto the media substrate; pinning and drying said ink once applied on the media substrate; and applying photo energy to the ink composition, said photo energy having a frequency and energy level suitable for curing the photo-curable ink composition.

FIG. 1 illustrates a method for producing printed articles according to some embodiments of the present disclosure. Such as illustrated in FIG. 1, the photo-curable ink composition, containing UV curable polyurethane dispersions (UV-PUD), water, photo-initiator, colorant, hydrophobic radiation-curable monomers and water-soluble or water-miscible radiation curable monomers, is applied onto a printable media via a projection of a stream of ink droplets (110). The projection of the stream of droplets of the inkjet compositions, onto the printable media, can be done via inkjet printing technique. The method for forming a printed article according to the present disclosure includes a pinning process (120), a drying process (130) and curing process (140).

In some examples, the projection of stream of droplets of ink composition (110), onto the media substrate, is done via inkjet printing techniques. The ink composition may be established on the material via any suitable printing techniques, such techniques include thermal, acoustic, continuous and piezoelectric inkjet printing. In inkjet printing devices, liquid ink drops are applied in a controlled fashion to an ink-receiving substrate, or media substrate, by ejecting ink droplets from a plurality of nozzles, or orifices, in a printhead of an inkjet printing device or inkjet printer. In drop-on-demand systems, a droplet of ink is ejected from an orifice directly to a position on the surface of an ink-receiving substrate, or media substrate, by pressure created by, for example, a piezoelectric device, an acoustic device, or a thermal process controlled in accordance digital data signals. For inkjet printing, the ink composition can be heated or chilled to an appropriate dispensation temperature, prior to ejecting the ink composition to the surface of a substrate. In some examples, the projection of stream of droplets of ink composition, onto the media substrate, is done via a piezoelectric printhead.

In some examples, the photo-curable ink composition can be applied/jetted to the media substrate at a jetting temperature of about 5° C. to about 15° C. By controlling the ink temperature, the dependency of the ink working point on the environmental conditions is reduced or eliminated. The system becomes more stable and easier to use. Without being linked by any theory, it is believed that since the ink composition contains large amount of water, by decreasing the ink temperature to 15° C. or lower, the ink jetting reliability increases considerably and the ink composition becomes more user friendly. Such ink composition examples described herein may have jetting reliability comparable to other water-based inks working in 25° C. while having much faster drying rate on the substrate and allowing minimal addition solvents (VOC).

For inkjet printing, the ink composition is heated or chilled to an appropriate dispensation temperature such as, for example, dispensation temperatures mentioned above, prior to ejecting the ink composition to the surface of a substrate. The particular temperature and viscosity of the ink composition is dependent on, for example, the particular method and equipment for conducting the ink jet printing. Considerations regarding temperature and viscosity of the ink composition relate to the effect on droplet size and droplet ejecting rate, for example. In some examples, the temperature is maintained relatively constant, which means that the temperature variation is controlled so that there is no more than a variation of ±1° C., or ±0.5° C., or ±0.2° C., or ±0.1° C., for example. Temperature control is achieved with appropriate temperature sensors, for example.

The ink composition, once applied on the media substrate, is then submitted to a pinning process (120) and to a drying process (130).

In some embodiment, after being jetted, the ink composition is immobilized (or pinned) to the media surface (120). The pinning process could be performed by applying low photo energy or low energy UV radiation provided, for example, by a LED. In some examples, "low level" Energy refers to energy in the range of about 1 to about 3 W/cm². UV LED can be used as an ink pinning radiation source, in order to pin the ink drop immediately after jetting but still allowing controlled spreading on the substrate. It is believed that, since water is not evaporated yet at this stage the ink does not fully crosslink, the viscosity of the ink droplet increases and the droplet thus is not completely immobilized and further spreading of the droplet is possible.

The printed or jetted ink composition is dried in a drying process (130) in a predetermined pattern onto the media substrate in view of evaporating the water content of the ink. The drying stage may be conducted, by way of illustration and not limitation, by hot air, electrical heater or light irradiation (e.g., IR lamps), or by a combination of such drying methods. In order to achieve a targeted performance level it is advisable to dry the ink at a maximum temperature allowable by the substrate that enables good image quality without substrate deformation. The temperature used for drying should be selected taking into consideration that fact that various plastic substrate materials tend to bend and deform at elevated temperatures. Consequently, the substrate deformation temperature should not be exceeded while drying. Examples of a temperature during drying include about 40° C. to about 150° C., or about 40° C. to about 70° C., for example. The ink composition according to the principles herein enables printing on rigid plastic materials while drying at relatively low temperatures of about 40° C. to about 70° C., or about 50° C. to about 60° C., for example, and while achieving fast drying time and good image quality.

In the drying process (130), a drying hot air system or IR radiation system lamps or combination of both, may be used with the printed media in order to evaporate the remaining water present in the ink composition. In some examples, such drying stage occurs at temperatures lower than 60° C. in order to avoid media deformation when printing on plastic substrates. Higher temperatures may be used to accelerate drying by evaporation according to desired performance and choice of media.

In some embodiment, the printed or jetted ink composition is cured (140) by applying photo energy to the ink composition, said photo energy having a frequency and energy level suitable for curing the ink composition. In such curing step, a mercury or similar lamp can be used in order to fully cure and cross link the ink composition to the media substrate. For applying photo energy, the photo-curable ink composition, on the media substrate, may be subjected to suitable light sources for curing the ink compositions in accordance with the principles described herein. Ultraviolet (UV) radiations can be used to cure the ink composition as described above. Curing radiation can be UV radiation radiated by UV lamps, blue lasers, UV lasers, or ultraviolet LEDs, for example. The curing radiation may be provided by a source of ultraviolet radiation operating in a continuous mode. The curing radiation may also be provided by a source of ultraviolet operating in a flash or pulsed mode. In some examples, in the curing process (140), the ink composition is cured by using, for example, a wide arc mercury lamp, in order to fully cure and crosslink the ink.

In accordance with the principles described herein, the photo-curable ink compositions find use as inkjet inks for inkjet printers. In some examples, the photo-curable ink compositions may be dispensed to the surface of a broad range of substrates employing inkjet technology and equipment. A suitable inkjet printer, according to the present method, is an apparatus configured to perform the printing, pinning, drying and ink curing processes. The printer may be a single pass inkjet printer or a multi-pass inkjet printer. The printer may include a temperature stabilization module operative to ensure maintenance of the range of ink jetting temperatures.

In some examples, the photo-curable ink composition is applied on a pre-treated media surface. An ink-receiver layer may be applied to certain substrates in a pretreatment stage prior to jetting the image in order to get the required image quality. The ink-receiving layer may be applied in a pre-treatment stage digitally by applying the ink-receiver layer with piezoelectric printheads, or the ink-receiving layer may be applied in the pre-treatment stage by analog methods such as spray gun or roller coater, for example. The ink receiver layer serves as a fixer for the ink composition dispensed to the surface of a substrate in part preventing movement of ink droplets on the substrate, where the movement may result in negative image quality effects.

As mentioned, the photo-curable ink composition is jetted onto a media substrate. The media substrate may be planar, either smooth or rough, or have any other shape that is suitable for the particular purpose for which it is employed. The media substrate can have a thickness in the range of about 0.1 mm to about 10 mm or in the range of about 1 mm to about 5 mm. The media substrate may be porous or non-porous, rigid, semi-rigid, or flexible, for example. Planar media substrates may be in the form, for example, of a film, plate, board, or sheet by way of illustration and not limitation.

Examples of media substrate include, but are not limited to, plastic substrates (for example, polyethylene terephthalate, polyethylene, polystyrene, polypropylene, polycarbonate, and acrylic), paper, paper laminated with plastic (for example, polyethylene, polypropylene, or polystyrene), cardboard, paperboard, foam board, and textiles. The media can also be rigid PVC (polyvinylchloride rigid substrate) or PETG (Polyethylene Terephthalate Glycol-modified). In some examples, the media substrate is non-porous and has low surface tension. Non-limiting examples include plastics, PVC, banner paper, and polypropylenes, and synthetic paper, such as Yupo® synthetic paper. Banner paper is specifically configured for printing banners, has a smooth surface, and is often designed for color printing. The term "non-porous" includes surfaces that can have relatively poor water permeability, absorption, and/or adsorption. Vinyl and other plastic sheets or films, metals, coated offset media, glass, and other similar substrates are considered non-porous. In some embodiments, the media substrate can be a plastic substrate. In some other embodiments, the media substrate is a rigid plastic substrate. In some examples, the media substrate is a polypropylene, a polyvinyl chloride (PVC), an acrylic or a polycarbonate substrate. In some other examples, the media substrate is a polyvinyl chloride (PVC) or a polycarbonate substrate. The media substrates can be non-swellable and/or are non-polar. By non-swellable, it is meant herein that the substrate surface is not swelled by any components of the ink, and no chemical bonds are formed between ink and substrate. By non-polar, it is meant herein that the substrate surface is charge-neutral, therefore adhesion to it is difficult to achieve.

In some embodiments, the present disclosure refers to an inkjet printing system that include a media substrate; at least one photo-curable ink composition containing UV curable polyurethane dispersions (UV-PUD), water, photo-initiator, colorant, hydrophobic radiation-curable monomers and water-soluble or water-miscible radiation curable monomers; and photo energy sources configured to apply photo energy to the ink composition once printed on a substrate, said photo energy having a frequency and energy level suitable for pinning, drying and curing the ink composition.

In some other embodiments, the present disclosure refers to method for preparing the above mentioned photo-curable ink composition. The method includes providing, in combination, ink composition containing UV curable polyurethane dispersion (UV-PUD), water, photo-initiator, colorant, hydrophobic radiation-curable monomers and water-soluble or water-miscible radiation curable monomers; subjecting the combination to conditions under which the ink composition becomes substantially uniform and have viscosity and surface tension suitable for jetting; and subjecting the combination to filtration.

In some examples, conditions for rendering the ink composition to a substantially uniform dispersion include, for example, agitation such as, e.g., one or more of mixing, stirring, shaking, homogenizing, sonication, ultra-sonication, micro-fluidization, bead milling, and blending, for example, or a combination of the above. In some examples the temperature during the above procedure may be, for example, about 10° C. to about 40° C., or about 20° C. to about 30° C. In some examples, the temperature is ambient temperature. The phrase "substantially uniform" means that there is no visible phase separation and that the ink composition applied by draw down results in a uniform film without visible defects such as de-wetting, clustering, or air bubbles, for example. The ink composition may be filtered to remove large particles that may prohibit reliable jetting. Filtration may be carried out using, by way of illustration and not limitation, one or more of membrane filtration, surface filtration, depth filtration, screen filtration, and filtration aid, for example.

EXAMPLES

1—List of Ingredients

TABLE (a)

| Ingredients name | Supplier | Ingredient type |
|---|---|---|
| Neorad ® R441 [aliphatic acrylated Urethane oligomer] | DSM | UV-PUD |
| Irgacure ® 819 [Bis(2,4,6-trimethylbenzoyl)-phenyl-phosphineoxide] | BASF | Photo-initiator |
| Omnirad ® ITX [2-isopropyl thioxanthone] | IGM | Photo-initiator |
| N-vinylcaprolactam | BASF | Hydrophobic monomer |
| SR415 ® [ethoxylated (20) trimethylolpropane triacrylate] | Sartomer | Water soluble monomer |
| Hostafine ® Blue B2G | Clariant | Pigment preparation |
| Byk ® 348 | Byk Chemie | Surfactant |

2—Ink Composition Formulations

Ink formulation I is prepared by mixing two different parts: Part A (hydrophobic phase) and Part B (water-phase). Part A contains N-vinylcaprolactam, Irgacure®819 and Omnirad® ITX. Part A is mixed for about 30 minutes with a Dispermat® mixer (available from Byk) until a uniform solution is achieved. Part B contains Neorad®R441, SR415® and Water. Part A is then mixed into Part B in a Dispermat® mixer for about 1 hour until a uniform dispersion is achieved, after which the pigment preparation and surfactants are added into the ink and mixed for additional 15 minutes. The ink is then filtered through a 1.2 micron absolute membrane filter. A Haake®RS-600 rheometer (Thermo Electron, Newington N.H.) is used to measure the ink viscosity, which is about 4 cps at 20° C. Ink surface tension, as measured by a Lauda® tensiometer (LAUDA Brinkmann LP, Delran N.J.), is about 30 dyne/cm at room temperature.

Ink formulation II is a comparative ink formula that does not contains any water-soluble monomers. The ink formulation II is prepared in two parts: Part A (hydrophobic phase A and water-phase B). Part A contains N-vinylcaprolactam, Irgacure®819 and Omnirad® ITX. Part A is mixed for about 30 minutes by a Dispermat® mixer until a uniform solution is obtained. Part B contains Neorad®R441 and Water. Part A is then mixed into Part B, for about 1 hour, until a uniform dispersion is achieved, after which pigments and surfactants are added into the ink and mixed for additional 15 minutes. The ink is then filtered through a 1.2 micron absolute membrane filter. A Haake®RS-600 rheometer is used to measure ink viscosity, which is about 3.3 cps at 20° C. Ink surface tension as measured by a Lauda® tensiometer is about 30 dyne/cm at room temperature.

Ink formulations I and II are illustrated in the TABLE (b) below. All percentages are expressed in wt % of the total composition.

TABLE (b)

| Ingredients name | Ink I | Ink II |
|---|---|---|
| Water | 39.25% | 46.75% |
| Neorad ® R441 | 42.5% | 42.5% |
| N-vinylcaprolactam | 6.9% | 6.9% |
| SR415 ® | 7.5% | — |
| Irgacure ® 819 | 0.45% | 0.45% |
| Omnirad ® ITX | 0.15% | 0.15% |
| Hostafine ® Blue B2G | 3% | 3% |
| Byk 348 ® | 0.3% | 0.3% |

3—Ink Composition Performances

Pinning Ability Testing Method:

A porous media substrate (corrugated board) is printed with a solid image at 400 dots per inch printed in 4 passes of 100 dpi each. The media is printed on XY printing test bed using the printing method A or printing method B. The ink composition is jetted via a single HP Scitex X2 Piezo printhead. The pinning step is performed with a low energy light source: 395 nm LED model RX Starfire®75 AC (from Phoseon Tech.). The drying step is performed using a hair dryer, model Silencio®1100W (from Braun). The curing step is performed using a mercury UV lamp (model UV-SK 1.6 kW, 160 W/cm, from Dr. Honle AG).

In method (A), the media substrate is printed with a method containing only the drying and the curing steps. Such method A does not encompass any pinning step. The media substrate is printed, with ink formulation I and ink formulation II, followed by 1 min drying under hot air at a temperature of about 40° C. Immediately after drying, the printed image is cured by passing the printed image under a broad range UV lamp once at a print speed of about 0.5 m/s.

In method (B), the media substrate is printed with a method containing the pinning, drying and curing steps, with ink formulation I and ink formulation II. The ink is pinned by exposing it to a LED light. The LED intensity varies from 0 to 100%. The LED is positioned straight after the printhead in the printing direction, so that immediately after printing the ink would be exposed to the LED. The printing is made in a unidirectional mode, the LED is turned off when the print head moved back to begin the next pass. During this pinning step, the image is exposed to the LED a total of 4 times corresponding to each of the printed passes. In the second step, the printed image is dried by hot air for 1 min at a temperature of about 40 degrees C. In the third and last step, the printed image is cured by a broad range UV lamp, by passing the image under the lamp once at a speed of about 0.5 m/s.

For both methods, A and B, the optical density and the gloss level are evaluated for the resulting printed article. The optical density is measured by means of an X-Rite Spectro-Eye. The gloss level at 75° is measured by a gloss meter from Byk-Gardner. The results are illustrated in the table (c) below.

TABLE (c)

| Measurement and performances | Ink I | Ink II |
|---|---|---|
| Ink viscosity (cps) at 20° C. | 4 | 3.3 |
| Ink surface tension (dyne/cm) at 20° C. | 30 | 30 |
| optical density | | |
| With Method A | 1.28 | 1.43 |
| With Method B | 1.61 | 1.41 |
| gloss level at 75° | | |
| With Method A | 9.3 | 10 |
| With Method B | 22.8 | 9 |

Such results demonstrates that, when using the ink formulation I according to the present disclosure, in a printing method that encompasses pinning, drying and curing processes, the resulting printed articles have higher gloss and higher optical density by comparison with the use of the same ink formulation in a printing method that does not contain any pining process. Such result demonstrates also that when using the ink Formulation II, in both printing methods A and B; the resulting printed articles do not present good gloss and optical density.

The invention claimed is:

1. A photo-curable ink composition, comprising colorant, an aqueous phase, and a non-aqueous phase, the aqueous phase including water, and water-soluble or water-miscible radiation curable monomers, and the non-aqueous phase being formed from UV curable polyurethane dispersions, and hydrophobic radiation-curable monomers;
   wherein at least one of the aqueous phase and the non-aqueous phase further includes a photo-initiator, and the non-aqueous phase represents from about 20 wt % to about 50 wt % by total weight of the ink composition.

2. The photo-curable ink composition of claim 1 wherein the water-soluble or water-miscible radiation curable monomers are present in the ink composition in an amount ranging from about 1 wt % to about 15 wt % by total weight of the ink composition.

3. The photo-curable ink composition of claim 1 wherein the water-soluble or water-miscible radiation curable monomers include esters of acrylic or methacrylic acid with polyethylene glycol or with a mono-, di-, tri-, or tetra-hydric alcohol derived by ethoxylating a mono-, di, tri-, or tetra-hydric aliphatic alcohol of molecular weight less than 200 with ethylene oxide.

4. The photo-curable ink composition of claim 1 wherein the water-soluble or water-miscible radiation curable monomers are acrylate esters of polyethylene glycols made from polyethylene glycol having a molecular weight of from about 200 to about 1500 and acrylic esters of ethoxylated trimethylolpropane having from 9 to 30 ethoxylate residues.

5. The photo-curable ink composition of claim 1 wherein the water-soluble or water-miscible radiation curable monomers are ethoxylated trimethylolpropane triacrylates.

6. The photo-curable ink composition of claim 1 wherein the water-soluble or water-miscible radiation curable monomers are acrylamides monomers.

7. The photo-curable ink composition of claim 1 wherein the UV curable polyurethane dispersions are present in an amount representing from about 1 wt % to about 25 wt % by total weight of the ink composition.

8. The photo-curable ink composition of claim 1 wherein the hydrophobic radiation-curable monomers are acrylate monomers or vinyl monomers.

9. The photo-curable ink composition of claim 1 wherein the hydrophobic radiation-curable monomers are selected from the group consisting of vinyl caprolactam, hexanediol diacrylate, trimethylolpropane triacrylate and propoxylated neopentyl glycol diacrylate.

10. The photo-curable ink composition of claim 1 wherein the composition contains water in an amount ranging from about 20 wt % to about 80 wt % by total weight of the ink composition.

11. A method for forming a printed article, comprising:
a) providing a photo-curable ink composition containing colorant, an aqueous phase, and a non-aqueous phase, the aqueous phase including water, and water-soluble or water-miscible radiation curable monomers, and the non-aqueous phase being formed from UV curable polyurethane dispersions, and hydrophobic radiation-curable monomers, wherein at least one of the aqueous phase and the non-aqueous phase further includes a photo-initiator, and the non-aqueous phase represents from about 20 wt % to about 50 wt % by total weight of the ink composition;
b) providing a media substrate;
c) projecting of stream of droplets of said photo-curable ink composition onto the media substrate;
d) pinning said ink composition once printed on the media substrate;
e) drying said ink composition; and
f) applying photo energy to the ink composition, said photo energy having a frequency and energy level suitable for curing the photo-curable ink composition.

12. The method for forming a printed article of claim 11, wherein the projection of stream of droplets of ink composition, onto the media substrate, is done via a piezoelectric printhead.

13. An inkjet printing system, comprising:
a) a media substrate;
b) at least one photo-curable ink composition comprising colorant, an aqueous phase, and a non-aqueous phase, the aqueous phase including water, and water-soluble or water-miscible radiation curable monomers, and the non-aqueous phase being formed from UV curable polyurethane dispersions, and hydrophobic radiation-curable monomers, wherein at least one of the aqueous phase and the non-aqueous phase further includes a photo-initiator, and the non-aqueous phase represents from about 20 wt % to about 50 wt % by total weight of the ink composition; and
c) photo energy sources configured to apply photo energy to said ink composition once printed on a substrate, said photo energy having a frequency and energy level suitable for pinning, drying and curing the photo-curable ink composition.

14. The inkjet printing system of claim 13, wherein the photo energy source is a UV light source.

15. A method for preparing photo-curable ink composition, comprising:
a) providing in combination colorant, an aqueous phase, and a non-aqueous phase, the aqueous phase including water, and water-soluble or water-miscible radiation curable monomers, and the non-aqueous phase being formed from UV curable polyurethane dispersions, and hydrophobic radiation-curable monomers, wherein at least one of the aqueous phase and the non-aqueous phase further includes a photo-initiator;
b) subjecting the combination to conditions under which the ink composition becomes substantially uniform; and
c) subjecting the combination to filtration.

* * * * *